United States Patent Office 2,844,562
Patented July 22, 1958

2,844,562

METHOD OF MIXING RESINOUS POLYMERIC STYRENE WITH A RUBBERY BUTADIENE POLYMER

Alvin R. Ingram, Glenshaw, Pa.

No Drawing. Application May 16, 1955
Serial No. 508,827

5 Claims. (Cl. 260—45.5)

This invention relates to the preparation of thermoplastic mixtures of a resinous polymeric styrene with a rubbery polymeric butadiene. More particularly it concerns a process for making such compositions to afford homogeneous polymeric styrene-rubber blends which are easier to mold, easier to pigment, are readily extrudable as smooth, glossy, uniform sheets, can be molded at lower molding temperatures, and give moldings having improved appearance and strength at weld lines, as compared with known thermoplastic blends of polymeric styrene and rubbers.

Pursuant to this invention, a thermoplastic polymeric styrene and a rubbery polymeric butadiene blend having improved homogeneity and strength at weld lines is readily prepared by mechanically mixing 75 to 97 weight parts of a high molecular weight molding grade polymeric styrene with 25 to 3 weight parts of a rubbery polymeric butadiene in the presence of a small amount of a metal peroxide of the group consisting of $MgO_2$, $CaO_2$, $ZnO_2$, $SrO_2$, $BaO_2$, $PbO_2$, and mixtures thereof in amount from about 0.03 to about 0.15 weight part $ZnO_2$ or equivalent of other metal peroxide per 100 weight parts of said combined polymeric styrene and polymeric butadiene into a uniform mass at a heat plasticizing temperature up to about 450° F. in the presence or absence of a plasticizer, as desired, until "homogeneity" is developed. By "homogeneity" is meant the point where a pearly luster, apparent in the early mixing stage, disappears. This normally takes less than one hour, usually less than one-half hour, depending upon the batch size, the types and proportions of molding grade polymeric styrene and polymeric butadiene used, the plasticizing temperature, and the amount or absence of plasticizer.

By "polymeric butadiene" is meant a conventional "hot" or "cold" rubbery butadiene homopolymer or copolymer, such as butadiene-styrene copolymer, butadiene-acrylonitrile copolymer, polybutadiene, and the like, having at least about 45% combined butadiene.

The high molecular weight molding grade polymeric styrene utilized in this invention advantageously has a molecular weight of about 50,000 to about 100,000 (Staudinger method), although other high molecular weight molding grade polymeric styrenes can be used. Included in the term "polymeric styrene" are homopolymers, copolymers and terpolymers of styrene. Suitable co-monomers in preparing resinous polymeric styrenes are: butadiene, acrylonitrile, alpha-methylstyrene, vinylnaphthalenes, nuclear-substituted styrenes, such as alkyl styrenes, chlorostyrenes, cyanostyrenes, etc. In place of styrene various nuclear-alkyl styrenes having no more than a total of six carbon atoms in the alkyl substituents, such as methyl styrenes, dimethyl styrenes, ethyl and diethyl styrenes, etc., as well as chloro and dichlorostyrenes, can be substituted for styrene in the practice of this invention. Resinous polymeric styrenes advantageously used in this invention have a relative viscosity of about 1.9–2.8, preferably about 2.1–2.5 (1 g./100 mls. toluene at 30° C., $$\text{relative viscosity} = \frac{\text{solution viscosity}}{\text{viscosity of toluene}}$$

at 30° C.). Compositions prepared from higher molecular weight polymeric styrene, ca. 60,000 and above, generally have greater impact strengths than those prepared from lower molecular weight polymeric styrene, ca. 50,000 and below.

The proportions of resinous polymeric styrene and rubbery polymeric butadiene vary between about 75 to 97 weight parts of the former to about 25 to 3 weight parts of the latter. A plasticizer is frequently advantageously used, generally in amounts up to about 5% by weight of the total batch. Among plasticizers which are advantageously used are butyl stearate, butyl Cellosolve stearate, dibutyl phthalate, tricresyl phosphate, mineral oil, low molecular weight plasticizing grade polystyrene, styrene- and alpha-methyl-styrene dimers and trimers, etc.

It is not necessary to use pure $ZnO_2$ or other indicated equivalent metal peroxide as the homogenizing agent for the subject compositions. On the contrary, commercial or technical grade metal peroxides such as technical $ZnO_2$ (ca. 50% $ZnO_2$ and 50% $ZnO$) are advantageously used, since they are more readily available and are more economical, provided that up to about 0.15 weight percent $ZnO_2$ (100% basis) or equivalent of other metal peroxide is used. Generally it makes no appreciable difference that an accompanying amount of metal oxide impurity, as found in commercial grades of these peroxides, is introduced with the metal peroxide. At least about 0.03 weight percent $ZnO_2$ or equivalent metal peroxide on a polymeric styrene-polymeric butadiene basis, is generally desired in preparing the improved homogeneous blends of this invention, while more than about 0.15% $ZnO_2$ or equivalent is not of sufficient additional value to warrant the increased cost. $ZnO_2$ is the metal peroxide of choice because it is non-toxic, is relatively less water-sensitive than other metal peroxides, and has a white color. Other metal peroxides are useful where color is immaterial or where manufacturing procedures are modified to provide anhydrous incorporation, or where exposure to toxic effects can be avoided.

The mechanical mixing of resinous polymeric styrene with rubbery polymeric butadiene in the presence of up to about 0.15% $ZnO_2$ or equivalent metal peroxide, pursuant to this invention, is advantageously carried out in a Banbury mixer, a Bolling mixer, on a two-roll mill, in a plastics extruder, or the like, where high shear kneading and cutting forces can be applied. Such mixing is performed, with cooling if necessary to prevent the batch temperature from exceeding 450° F., at heat plasticizing temperatures from about 280° F. to about 450° F. for a time sufficient to attain homogeneity, i. e., when a pearly luster which develops in the early mixing stage disappears. The time required for such homogenization varies with the size and proportions of batch components, type of mixer and heat plasticizing temperature; and generally less than one hour and usually less than one-half hour suffices. Immediately after homogenization, blends prepared in the presence of 0.03% or more $ZnO_2$ or equivalent metal peroxide can be molded at markedly lower temperatures (at least by 50° F.) than with similar blends made without added peroxide.

The following examples are in illustration of, and not in limitation of, this invention. Parts and percentages are by weight unless otherwise noted.

EXAMPLE 1

In the following series, mixtures of 86 to 92 parts molding grade polystyrene having a relative viscosity of 2.25 (1% in toluene) and containing 2% butyl Cellosolve stearate plasticizer and 14 to 8 parts of a conventional "cold" rubbery copolymer of 23.5% styrene and 76.5% butadiene are mixed in a Banbury mixer with 0.06 part of technical grade $ZnO_2$ (50% $ZnO_2$, 50% ZnO) and 1% ZnO, rubber basis, for 6 minutes, the temperature rising to about 400° F. At the end of about 5 minutes, 2% di-t-butyl-para-cresol antioxidant, rubber basis, is added. At the end of about 6 minutes, pearly luster is absent, indicating homogenization of the batch. The batch is then cooled and granulated for molding into products as indicated and characterized in the following table:

Table I

| Blend | | Ring Formation [1] | | Hump In Extruded Sheet [2] | | Weld Index [3] | |
|---|---|---|---|---|---|---|---|
| Polystyrene | Rubber | No $ZnO_2$ | With $ZnO_2$ | No $ZnO_2$ | With $ZnO_2$ | No $ZnO_2$ | With $ZnO_2$ |
| 86 | 14 | Yes | No | Yes | No | 35 | 58 |
| 90 | 10 | Yes | No | Yes | Very slight | 42 | 59 |
| 92 | 8 | Yes | No | Yes | No | 47 | 74 |

[1] Appearance of concentric rings about sprue of a center-gated injection-molded sheet, 8" x 14" x 0.125", is unsatisfactory.
[2] Sheet extruded by a National Rubber Machinery 2½-inch extruder with a 12-inch sheeting die. Unsatisfactory sheets are thicker ("hump") in the center than at the edges.
[3] Weld index = load in lbs. at rupture × angle in degrees at rupture with double-gated A. S. T. M. tensile specimen placed in center clamp of Tinius-Olsen Stiffness Tester (50 inch-pounds model) so that weld mark protrudes exactly 0.125" from edge of clamp and free end of specimen rests upon bending pin 2" from edge of clamp.

Similar advantageous results are obtained when other rubbery butadiene-styrene and butadiene-acrylonitrile copolymers having 45% and more combined butadiene are substituted for the rubber used above, and when 0.07 part technical $MgO_2$ (25%), 0.037 part technical $CaO_2$ (60%), 0.043 part technical $SrO_2$ (85%), 0.062 part technical $BaO_2$ (85%) and 0.079 part technical $PbO_2$ (93%) are substituted for the $ZnO_2$ used above.

EXAMPLE 2

In the following series, mixtures of 90 parts high molecular weight polystyrene containing 2% butyl Cellosolve stearate having a relative viscosity of 2.25, 10 parts 76.5–23.5 butadiene-styrene rubber (GR-S 1503), 0.125 part zinc stearate, with varying amounts of technical $ZnO_2$ and 0.2% DBPC brand of di-t-butyl-p-cresol, a conventional antioxidant, are blended in a Bolling mixer to homogeneity, which requires about 6 minutes. The maximum batch temperature is 400° F. Comparative ultraviolet resistance of such blends is as follows:

Table II

ULTRAVIOLET LIGHT STABILITY OF ZINC PEROXIDE-MODIFIED BLENDS OF POLYSTYRENE AND GR-S 1503

| Percent of Tech.$ZnO_2$ (50%) | Percent of ZNO | Percent of DBPC | $B_y$* Reading Before Fade-Ometer Exposure | $B_y$* Reading After Fade-Ometer Exposure | |
|---|---|---|---|---|---|
| | | | | 120 Hours | 300 Hours |
| 0.00 | 0.05 | 0.20 | −1.99 | 20.63 | 51.70 |
| 0.06 | 0.00 | 0.20 | −1.54 | 15.74 | 41.28 |
| 0.12 | 0.00 | 0.20 | −1.36 | 14.33 | 44.45 |
| 0.24 | 0.00 | 0.20 | −0.74 | 14.02 | 41.10 |
| 0.36 | 0.00 | 0.20 | −0.40 | 13.63 | 40.73 |

$B_y$ data obtained with the PPG-IDL "Color Eye" Instrument (Pittsburgh Plate Glass-Instrument Development Laboratories).

*$B_y = \frac{R_x - R_z}{R_x} \times 100$ where R=percent reflectance through the above-noted "Color Eye" filters. As yellowness increases, $B_y$ increases.

While the above examples show the use of butyl Cellosolve stearate as a plasticizer for polystyrene, the invention can be practiced in the absence of a plasticizer and in the presence of other plasticizers and modifying agents.

What is claimed is:

1. Method of making thermoplastic compositions containing a resinous polymeric styrene and a rubbery polymeric butadiene which comprises blending 75 to 97 weight parts of a resinous polymeric styrene with 25 to 3 weight parts of a rubbery polymeric butadiene in the presence of a metal peroxide of the group consisting of $MgO_2$, $CaO_2$, $ZnO_2$, $SrO_2$, $BaO_2$, $PbO_2$ and mixtures thereof in amounts from about 0.03 to 0.15 weight parts zinc peroxide equivalent per 100 weight parts of said blended polymeric styrene and polymeric butadiene by mechanically mixing said ingredients into a uniform mass at a temperature from about 280° F. to about 450° F. for a time sufficient to attain homogeneity as determined by disappearance of pearly luster of said compositions.

2. Method of claim 1 in which up to about 5% plasticizer, total batch basis, is included.

3. Method of claim 1 in which the mechanical mixing is continued for a period up to about 1 hour.

4. Method of claim 1 in which the rubbery polymeric butadiene has at least about 45 weight percent combined butadiene.

5. Method of claim 1 in which the rubbery polymeric butadiene has 76.5% combined butadiene and 23.5% combined styrene.

References Cited in the file of this patent

UNITED STATES PATENTS

| 2,439,202 | Daly | Apr. 6, 1948 |
| 2,638,462 | Borders | May 12, 1953 |

OTHER REFERENCES

"Rubber Age," January 1954, page 556, column 1 (Crater).

Dewey and Almy Technical Bulletin Darex Copolymer X34, Number C1; June 1949, page 3.